(12) United States Patent
Alford et al.

(10) Patent No.: US 10,910,808 B2
(45) Date of Patent: *Feb. 2, 2021

(54) CORD REEL INCLUDING A CONDUCTIVE POLYMERIC SHEATH WITH A CONDUCTIVE EMI DRAIN

(71) Applicants: John Alford, Kenosha, WI (US); Chris Hinojosa, Winthrop Harbor, IL (US); John S. Runzel, Elgin, IL (US); Christopher Gazdic, Arlington Heights, IL (US)

(72) Inventors: John Alford, Kenosha, WI (US); Chris Hinojosa, Winthrop Harbor, IL (US); John S. Runzel, Elgin, IL (US); Christopher Gazdic, Arlington Heights, IL (US)

(73) Assignee: Konnectronix, Inc., Waukegan, IL (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/967,128

(22) Filed: Apr. 30, 2018

(65) Prior Publication Data

US 2018/0269673 A1 Sep. 20, 2018

Related U.S. Application Data

(63) Continuation of application No. 14/618,545, filed on Feb. 10, 2015, now Pat. No. 9,960,587.

(60) Provisional application No. 62/090,163, filed on Dec. 10, 2014.

(51) Int. Cl.
*H02G 11/02* (2006.01)
*B65H 75/44* (2006.01)
*H01B 7/00* (2006.01)

(52) U.S. Cl.
CPC ......... *H02G 11/02* (2013.01); *B65H 75/4434* (2013.01); *H01B 7/00* (2013.01); *B65H 2701/34* (2013.01)

(58) Field of Classification Search
CPC .... H02G 11/00; H02G 11/003; H02G 11/006; H02G 11/02; H01B 7/00; H01B 7/0045; H01B 7/02; H01B 7/16; H01B 7/17; H01B 7/18; H01B 11/00; H01B 11/02
See application file for complete search history.

(56) References Cited

U.S. PATENT DOCUMENTS 9,960,587 B2 * 5/2018 Alford .................. H02G 11/02

* cited by examiner

*Primary Examiner* — Robert J McCarry, Jr.
(74) *Attorney, Agent, or Firm* — Vitale, Vickrey, Niro & Gasey LLP

(57) ABSTRACT

A cord reel cable including a polymeric sheath with a conductive EMI drain and a method of manufacture therefor. The cord reel includes a cable comprising power and data conductors, as wells as a single drain wire which is grounded to a cord reel housing or spool or the like. The drain wire contacts an outer ETFE layer surrounding the cable in order to provide EMI shielding to the cable.

11 Claims, 3 Drawing Sheets

CORD REEL INCLUDING A CONDUCTIVE POLYMERIC SHEATH WITH A CONDUCTIVE EMI DRAIN

PRIORITY OF INVENTION

This Application is a Continuation of Ser. No. 14/618,545 filed on Feb. 10, 2015, which claims priority to Provisional Application No. 62/090,163, filed Dec. 10, 2014.

FIELD OF INVENTION

The present invention relates to a system for the retractable delivery of an electrical connection via cord reel. More specifically, the present invention relates to a cord reel having multiple conductors comprising an outer jacket of a conductive polymeric material and drain or drain wire amongst the conductors which contacts the outer jacket in order to reduce or eliminate electromagnetic interference into the cable.

BACKGROUND OF THE INVENTION

Retractable reels have been used in various applications to retractably store various types of cables. For example, one successful cord reel assembly has been developed that comprises a spool on which the extendable portion of cord is held, an expansion chamber in which a fixed length of cable is spirally wound. The two cable portions are connected, typically in or adjacent the hub of the spool. As the spool rotates the spirally wound, fixed cable expands and contracts within the expansion chamber. An example of reels of this type is disclosed in U.S. Pat. No. 5,094,396 to Burke, the disclosures of which are hereby incorporated by reference.

In order to provide a usable product for a variety of operating environments for such cord reels, it is necessary to provide a mechanism to enable the prevention of interference (e.g., EMI/RFI). However, since the kinds of cords reels involved often require repeated winding and unwinding, whatever EMI protection is used needs to be flexible and durable.

DESCRIPTION OF THE PRIOR ART

Those of skill in the art understand that conductive shields (e.g., copper layers) may be used to great success in preventing EMI and cross talk in a cable. For instance, U.S. Pat. No. 7,692,099 (Burke), teaches (among other things) the use of tinned copper shielding comprising 38AWG tinned copper with an inner shield minimum of 90% EMI coverage and an outer shield minimum of 85% coverage. Likewise, such teachings include the use of a copper shield for individual conductors to eliminate crosstalk between such individual conductors in the cable. Such prior art approaches further teach the use of additional layers outside the bundle of conductors to improve durability, such as a further Teflon layer and a braid jacket covering. Such approaches, while useful in a variety of applications, have their limitations. For instance, such shields will have a tendency to "whisker" or fray over time. Additionally, the use of multiple layers may limit the flexibility of the resulting cable, depending upon the desired application.

Alternatively, certain prior art approaches teach the availability of encapsulation techniques for wire assemblies. However, many materials for encapsulation do not have the desire strength and/or flexibility to be employed in a cord reel cable, nor do many materials have the necessary flame, smoke and toxicity resistance required of many cord reel assembly applications. In addition, such approaches do not enable the production of cable assemblies with multiple wire components connected to one another, such as the "flat-round" cable assembly referenced above. For instance, in order to enable the manufacture of a "flat-round" cable, it is necessary to have an exposed cable end at the point of the flat-round junction. Thus, the use of encapsulate wire, without more, would require removing at least a portion of the encapsulation which would unduly degrade or eliminate any shielding provided by the encapsulation.

In sum, none of these prior art approaches permit a cord reel_assembly to provide a thinner or single layer covering for a multiconductor cable with durability and EMI/crosstalk resistance.

What is needed is thin, durable and EMI/crosstalk resistant solution for the manufacture of a cord reel assembly.

Definition of Terms

The following terms are used in the claims of the patent as filed and are intended to have their broadest plain and ordinary meaning consistent with the requirements of the law.

"ETFE" is a polymer which is also known as poly(ethene-co-tetrafluoroethene).

A "drain wire" is a single conductor which connects the ETFE to ground.

"Tinsel" is an electrical wire for application when high mechanical flexibility is required.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes a cable comprising a bundle of conductors including at least one power conductor, at least one data conductor, and a single drain wire which is grounded to a cord reel housing or spool or the like. The drain wire contacts an outer conductive polymeric layer, such as ETFE in order to provide EMI shielding to the cable. The ETFE is vacuum sealed around the bundle of conductors and does not extend to at least one end of the bundle of conductors so as to facilitate the connection of the cable to another wire or cable in the assembly (e.g., by soldering). The cross section of the cable further includes a core, with the bundle of conductors being spaced around the core such that the drain wire is substantially opposite the power conductor so as to minimize crosstalk. Further, the conductors other than the drain wire may be coated with a Teflon or similar coating, and the conductors are twisted around one another along the length of the cable so as to provide a helical configuration to better resist EMI and crosstalk.

The immediate application of a present invention will be seen in flat-round cable assembly, though those of skill will see that the present invention could be applied to other cable assemblies where the complete encapsulation of the cable may not be practical.

Thus can be seen that one object of the present invention is to provide a flexible, thin and durable EMI shield for a cable in a cord reel assembly.

A further object of the present invention is to provide an EMI shield mechanism for a non-encapsulated cable in a cord reel assembly.

Still another object of the present invention is to provide a cord reel assembly with a drain for transferring external EMI away from data conductors in the cable.

Yet another object of the present invention is to provide a cord reel assembly having superior EMI and crosstalk resistance.

Still another object of the present invention is to provide a cord reel assembly which reduces or eliminates whiskering or fraying in a cable while still providing acceptable flame, smoke and toxicity resistance.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
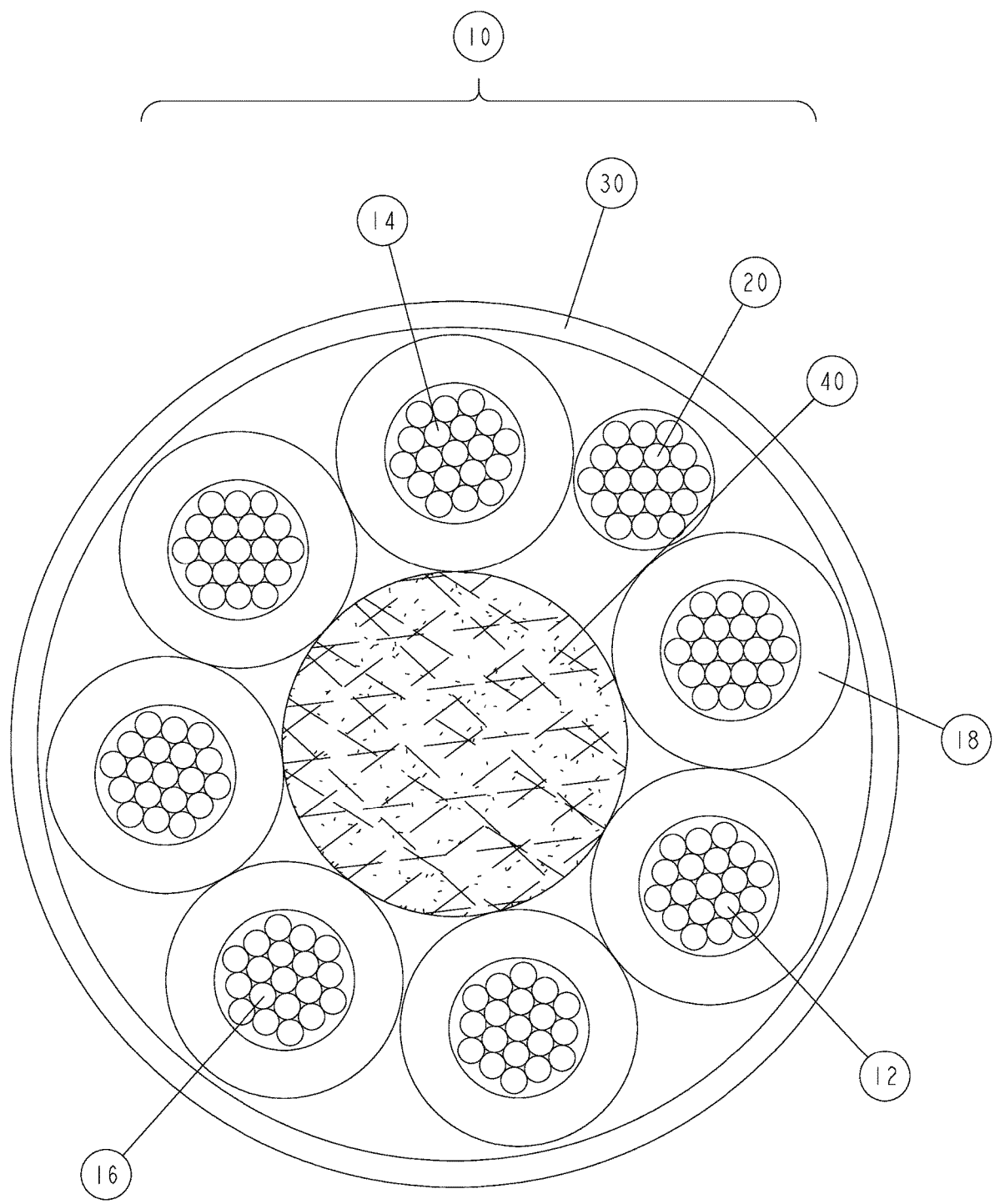
FIG. 1 shows a cross section of a cable in accord with a preferred embodiment of the present invention.

FIG. 1 shows a cable 10 having a cross sectional profile in accord with a first preferred embodiment of the present invention. The cable 10 comprises a series of conductors 12, including at least one power conductor 14 and at least one data wire 16. These conductors are preferably of a thickness or wire gage of 28AWG, and are made of a 19/40 stranded 135 alloy for this preferred embodiment. In addition, all of the conductors 12 of this embodiment preferably include an insulation layer 18 made of 0.006" of FEP or Teflon, except for the single drain wire 20. The drain wire 20 connects at one end to ground, such as a cord reel housing or spool (not shown).

Surrounding the bundle of conductors 12 is an outer layer 30 made up of a conductive polymer such as PVC or ETFE to provide a flexible yet strong cover for the conductors 12 while having desirable flame resistance, smoke resistance and non-toxicity characteristics. The conductive polymer, however, does not fully encapsulate the cable, such that at least one end of the wire is exposed so as to enable the cable to connect to another cord (e.g., a flat wire) in a cord reel housing 110 (as detailed in FIG. 2), as well as to enable the connection of the drain wire to ground via a cord reel housing or spool (also not shown). One of the advantages of using such a drain wire 20 is that because the outer layer 30 is typically an extruded polymer, such a material makes it hard to crimp the outer layer 30 to a draining source such as a chassis, housing or spool. Such combination of a conductive polymeric outer layer 30 and drain wire(s) 20 thus reduce or eliminate radiated emissions that enter the outer layer 30 from the conductors 12 inside of the shield and emissions that might come from the outside of the outer layer 30. These emissions must be drained to a source such as the chassis. Thus, the drain wire(s) is used to absorb the emissions, and the drain wire(s) are easily crimped to allow the radiated emissions to dissipate. Of course, those of skill in the art will understand that more than more drain wire can be used with the present invention, and that a given drain wire may be outside of the ETFE or similar outer jacket, so long as the drain wire is in contact with the surface of the outer jacket.

Preferably, the conductors 12 are twisted around a cotton core 40 or similar structure to maintain a circular cross section configuration along the length of the cable, e.g., so as to make one 360 degree rotation around the core along a 1" length of the cable. Such a configuration provides contact around the interior circumference between the outer layer 30 and the drain wire 20 so that any EMI that permeates the outer layer 30 can be drained away to ground. In addition, in its most preferred embodiment, the drain wire is spaced apart from the power conductor 14 so as to be substantially across from the cotton core 40. This spacing provides superior resistance to any crosstalk adversely impacting the performance of the cable 10.

The conductive polymeric layer can be terminated to a connector without the at least one drain wire by having the connector strain relief grip/crimp onto the jacket and connect to the connector housing for a shield connection.

Those of skill having the teaching of the present invention will realize, however, that alternative embodiments can employ a drain feature which does not require a "drain wire," per se, but does include a drain for draining EMI. For instance, the conductive polymeric layer 30 can also be terminated to the housing of a connector if a mold is formed with a conductive polymeric material that contacts the connector housing for a shield connection. A further alternative for providing such a drain could be enabled by terminating the conductive polymeric layer 30 to a housing of a device with a metallic cord grip or kellum that secures itself upon the conductive polymeric layer and directly contacts the housing. Still a further alternative drain could be enabled in the absence of the preferred drain wire through applying a conductive heat shrink for direct connection between two conductive polymeric layers or to secure a separate connection point for draining EMI. Such alternatives, however, are believed to be inferior at present to the preferred embodiment of the drain wire insofar as extended wear or tear in the conductive polymeric layer 30 could cause gaps or breaks in that layer which are believed to cause unacceptable degradation in the EMI shielding in the absence of the preferred drain wire (in contrast to the alternative drains falling within the scope of the present invention).

Figure 2:
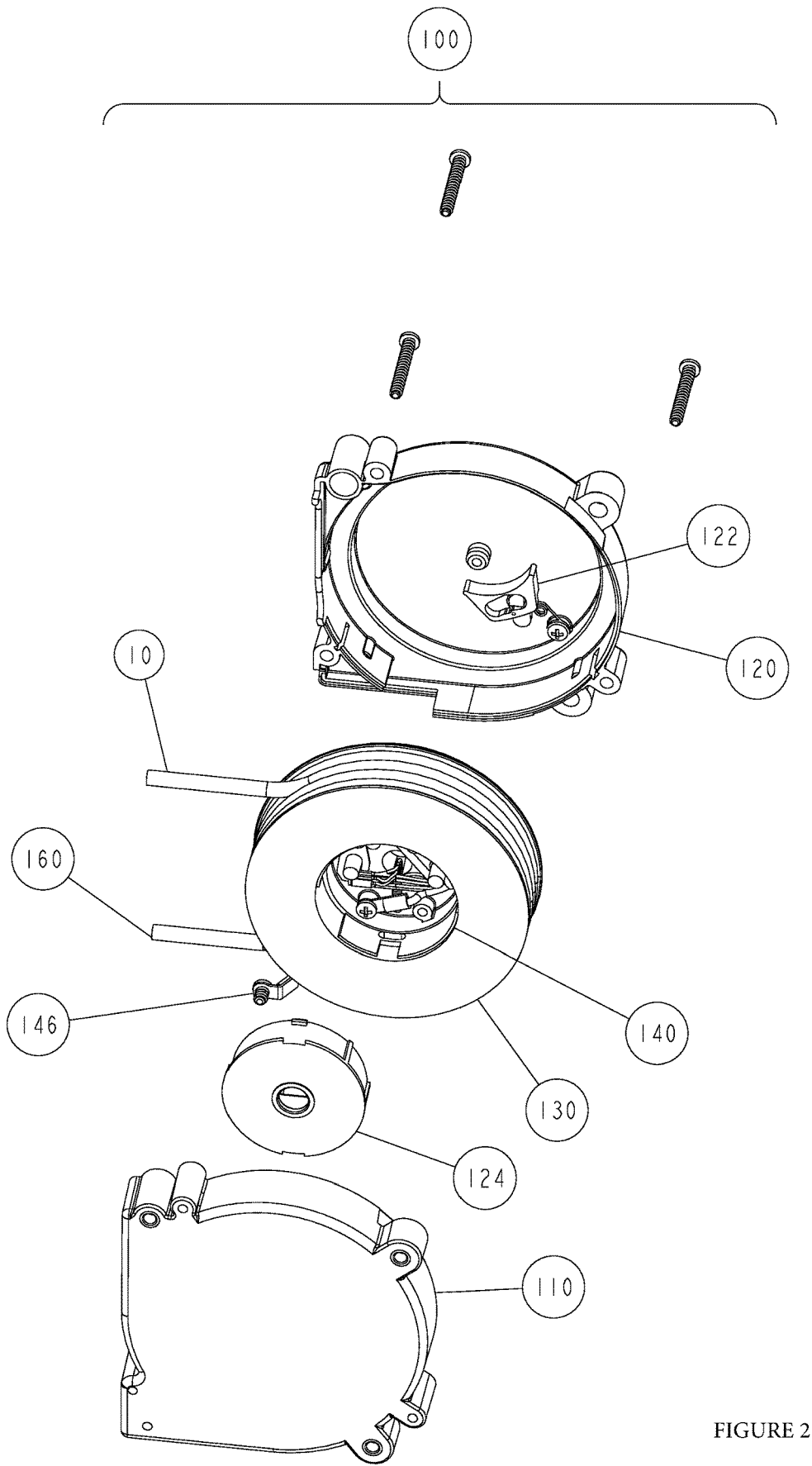
FIG. 2 shows an exploded view of a cord reel assembly in accord with a preferred embodiment of the present invention.
Figure 3:
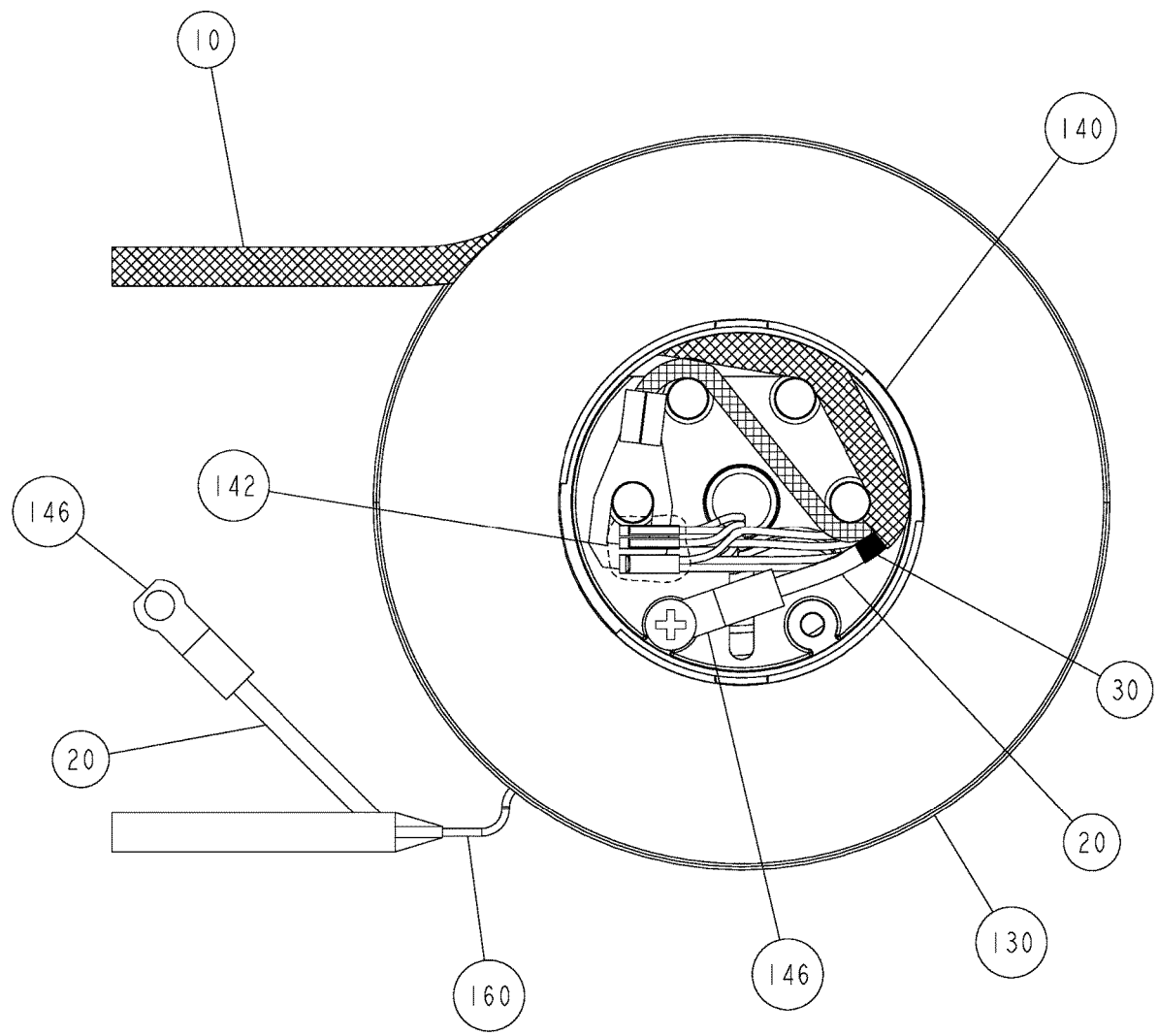
FIG. 3 shows a partially exposed side view of a spool and cable in accord with a preferred embodiment of the present invention.

The present invention can be used in a cord reel assembly 100 as shown in FIG. 2. The cord reel assembly of this example includes a housing 110, a cover 120, and a spool 130. The spool 130 can be controllably wound or unwound through the use of (for example) a ratchet 122, which along with a spring retainer 124 operates to control the mechanics of winding and unwinding the cord reel. In this embodiment, the cable 10 is a round cable which terminates at one end inside the inner connection chamber 140 located inside of the spool 130 in order to connect to a further cable or electrical connection (such as a flat cable 160). The inner connection chamber 140 of this example embodiment is detailed further in FIG. 3, which includes a splice 142 for connecting the cable and the flat cable 160, a drain mechanism 144, which can be a connection from an exposed end of the drain wire 20 to a ground lug 146, or alternatively can comprise one of the alternate drains detailed above.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the specific wire gages used in the examples of the preferred embodiments of present invention is for illustrative purposes with reference to the example drawings only. Similarly, while the preferred embodiments of the present invention are focused upon use within a cord reel assembly, those of skill in the art will understand that the invention has equal applicability to multi-conductor cables which cannot be completely encapsulated but still required EMI and cross talk resistance. Likewise, it will be appreciated by those skilled in the art that various changes, additions, omissions, and modifications can be made to the illustrated embodiments without departing from the spirit of the present invention. All such modifications and changes are intended to be covered by the following claims.

We claim:

1. A cord reel assembly comprising:
a) a housing,
b) a spool located within the housing; and
c) at least one cable for winding and unwinding around the spool, the cable having a substantially round cross-sectional profile comprising:
   i) at least one power conductor;
   ii) at least one drain wire;
   iii) a conductive polymeric layer surrounding the at least one power conductor, wherein the conductive polymeric layer contacts and surrounds at least a portion of the at least one drain wire, and at least one end of the at least one drain wire is not covered by the conductive polymeric layer and contacts at least one of the housing or the spool.

2. The cord reel assembly of claim 1, wherein the conductive polymeric layer is ETFE.

3. The cord reel assembly of claim 1, wherein the drain wire is comprised of tinsel.

4. A cord reel assembly comprising:
a) a housing,
b) a spool located within the housing; and
c) at least one cable for winding and unwinding around the spool, the cable having a substantially round cross-sectional profile comprising:
   i) at least one data conductor;
   ii) at least one drain wire;
   iii) a conductive polymeric layer surrounding the at least one data conductor, and wherein the conductive polymeric layer contacts and surrounds at least a portion of the at least one drain wire, and at least one end of the at least one drain wire is not covered by the conductive polymeric layer and contacts at least one of the housing or the spool.

5. A cord reel assembly comprising:
a) a housing,
b) a spool located within the housing; and
c) at least one cable for winding and unwinding around the spool, the cable having a substantially round cross-sectional profile comprising:
   i) at least one data conductor;
   ii) at least one power conductor;
   iii) at least one drain wire;
   iv) a conductive polymeric layer surrounding the at least one data conductor, and the at least one power conductor, wherein the conductive polymeric layer contacts the at least one drain wire.

6. The cord reel assembly of claim 5, wherein the at least one end of the at least one drain wire is not covered by the conductive polymeric layer.

7. A cord reel assembly comprising:
a) a housing,
b) a spool located within the housing; and
c) at least one cable for winding and unwinding around the spool, the cable having a substantially round cross-sectional profile comprising:
   i) at least one data conductor;
   ii) at least one power conductor;
   iii) at least one drain;
   iv) a conductive polymeric layer surrounding the at least one data conductor, and the at least one power conductor, wherein the conductive polymeric layer contacts the at least one drain.

8. The cord reel assembly of claim 7, wherein the conductive polymeric layer is ETFE.

9. A cord reel assembly comprising:
a) a housing,
b) a spool located within the housing; and
c) at least one cable for winding and unwinding around the spool, the cable having a substantially round cross-sectional profile comprising:
   i) at least one drain wire;
   ii) at least one conductor;
   iii) a conductive polymeric layer surrounding the at least one conductor, wherein the conductive polymeric layer contacts the at least one drain wire and conducts to at least one of the housing or the spool.

10. A cord reel assembly comprising:
a) a housing,
b) a spool located within the housing; and
c) at least one cable for winding and unwinding around the spool, the cable having a substantially round cross-sectional profile comprising:
   i) at least one drain mechanism;
   ii) at least one conductor;
   iii) a conductive polymeric layer surrounding the at least one conductor, wherein the conductive polymeric layer contacts the at least one drain mechanism.

11. A cord reel assembly comprising:
a) a housing,
b) a spool located within the housing; and
c) at least one cable for winding and unwinding around the spool, the cable having a substantially round cross-sectional profile comprising:
   (i) at least one data conductor;
   (ii) at least one power conductor;
   (iii) at least one drain wire;
   (iv) a conductive polymeric layer surrounding the at least one data conductor, and the at least one power conductor, wherein the conductive polymeric layer contacts the at least one drain wire.

* * * * *